US012516797B1

(12) United States Patent
Li

(10) Patent No.: US 12,516,797 B1
(45) Date of Patent: Jan. 6, 2026

(54) QUICK-DRAW ASSEMBLY STRUCTURE AND FLASHLIGHT

(71) Applicant: Wenjie Li, Guangzhou (CN)

(72) Inventor: Wenjie Li, Guangzhou (CN)

( * ) Notice: Subject to any disclaimer, the term of this patent is extended or adjusted under 35 U.S.C. 154(b) by 0 days.

(21) Appl. No.: 19/071,838

(22) Filed: Mar. 6, 2025

(30) Foreign Application Priority Data

Dec. 2, 2024 (CN) ......................... 202411752472.2

(51) Int. Cl.

| | |
|---|---|
| ***F21V 21/008*** | (2006.01) |
| ***F21L 4/00*** | (2006.01) |
| ***F21V 21/08*** | (2006.01) |
| ***F21V 21/088*** | (2006.01) |
| ***F21V 21/096*** | (2006.01) |
| ***F21V 21/16*** | (2006.01) |

(52) U.S. Cl.
CPC ............ *F21V 21/008* (2013.01); *F21L 4/005* (2013.01); *F21V 21/08* (2013.01); *F21V 21/0885* (2013.01); *F21V 21/0965* (2013.01); *F21V 21/16* (2013.01)

(58) Field of Classification Search
CPC ........ F21V 21/08; F21V 21/16; F21V 21/145; F21V 21/0965; F21V 21/0885; F21L 4/005
USPC .......................................................... 362/191
See application file for complete search history.

(56) References Cited

U.S. PATENT DOCUMENTS 5,593,074 A * 1/1997 Matthews ................. A45F 5/02 362/396
5,921,657 A * 7/1999 Case ..................... F21V 21/406 362/103
7,703,940 B2 * 4/2010 Dalton .................... F21S 6/007 362/396
9,909,744 B2 * 3/2018 Pontano ................ F21V 21/145
12,085,241 B1 9/2024 Bertken
2008/0180946 A1 * 7/2008 Kim .................... F21V 23/0414 362/205
2012/0275143 A1 * 11/2012 Robinson ................ F21L 4/005 362/184
2013/0120978 A1 5/2013 Opolka

FOREIGN PATENT DOCUMENTS

DE 102020108165 A1 9/2021

* cited by examiner

*Primary Examiner* — Laura K Tso
(74) *Attorney, Agent, or Firm* — Maier & Maier, PLLC

(57) ABSTRACT

A quick-draw assembly structure and a flashlight are provided. The structure includes: a sleeve is slidably mounted on a main housing; a locking member is disposed at an end of the main housing, a mounting groove is provided at an end of the locking member away from the main housing, and a plurality of through holes are circumferentially arranged around the locking member, the through holes are corresponded to a location of the mounting groove, and a retaining member is slidably mounted within each of the through holes; an end cap, the end cap comprises a mounting post configured to be inserted into and removed from the mounting groove, the mounting post comprises a locking groove corresponded to the through holes, and the locking groove is engaged with the retaining member along a predetermined arcuate surface; the end cap further includes a connecting member.

10 Claims, 5 Drawing Sheets

QUICK-DRAW ASSEMBLY STRUCTURE AND FLASHLIGHT

CROSS-REFERENCE TO RELATED APPLICATIONS

The present application claims priority to Chinese Patent Application No. 202411752472.2, filed on Dec. 2, 2024 the content of all of which is incorporated herein by reference.

FIELD

The present disclosure relates to the field of lighting equipment technology, particularly to a quick-draw assembly structure and a flashlight.

BACKGROUND

As a handheld electronic lighting tool, flashlights play an essential role in daily life. With the continuous development of technology and the growing portability needs of users, flashlights are also gradually evolving towards being portable, miniaturized, and lightweight. Although it facilitates users to carry and use the flashlight at all times, it also creates the problem of small flashlights being easily lost. To solve the problem, manufacturers typically arrange a tail end of small flashlights with a non-slidably lanyard or clip, allowing users to secure the flashlight to a backpack strap, key ring, etc., thereby preventing loss.

In the prior art, when using a small flashlight fixed with a lanyard or buckle, due to binding keychains, backpack chains, and other items, the lanyards and clips are non-removable, making the usage more cumbersome. In emergency situations requiring rapid access to the flashlight, users cannot quickly retrieve or disassembly the flashlight for immediate manipulation, leading to a poor user experience. Therefore, the prior art requires further improvement and development.

SUMMARY

In order to solve the problem in prior art where small flashlights secured with lanyards and clips, the attachments are non-slidably from the flashlight, leading to inconvenience during use as the small flashlights must be carried together with keys, backpack chains, making cumbersome. In emergency situations when rapid access to the flashlight is required, it cannot be quickly obtained or detached, thus hindering intuitive and convenient operation, the present disclosure provides a quick-release mounting structure and a flashlight.

The present disclosure achieves these objectives through the implementation of the following technical solutions:

A quick-draw assembly structure, including:

a main housing, a sleeve is slidably mounted on the main housing;

a locking member, the locking member is disposed at an end of the main housing, a mounting groove is provided at an end of the locking member away from the main housing, and a plurality of through holes are circumferentially arranged around the locking member, a position of each through hole corresponds to a location of the mounting groove, and a retaining member is slidably mounted within each of the through holes;

an end cap, the end cap includes an mounting post that is configured to be inserted into and removed from the mounting groove, the mounting post includes a locking groove positioned corresponding to the through holes, and the locking groove is engaged with the retaining member along a predetermined arcuate surface; the end cap further includes a connecting member.

In the quick-draw assembly structure, the retaining member is spherical and a flange section is provided at an end of the locking member away from the main housing;

a clearance ring is provided at an end of an inner side of the sleeve corresponding to the flange section, a side of the clearance ring facing the through holes is inclined at a predetermined angle, and the clearance ring is configured to provide movement space for the retaining member;

the plurality of through holes are arranged on a same cross-section of the locking member. An end of each through hole facing the mounting groove is provided with a lock ring, and a side of the lock ring facing inward the through holes is shaped to match a spherical surface of the retaining member.

In the quick-draw assembly structure, a reset spring is provided in the main housing. A fixed end of the reset spring is fixedly connected to the main housing, while an adjustable end of the reset spring is fixed within the sleeve at a position corresponding to the clearance ring. The reset spring limits a sliding distance of the sleeve and resets a position of the sleeve.

In the quick-draw assembly structure, a plurality of slide grooves extending along a length of the main housing are arranged on an outer side of the main housing. The fixed end of the reset spring is located at an end of each slide groove, and another end of each slide groove is closed;

a plurality of slide rails corresponding to the plurality of slide grooves are provided on an inner side of the sleeve, the plurality of slide rails and the plurality of slide grooves are one-to-one corresponded and are slidably and engageably connected.

In the quick-draw assembly structure, a first magnetic member is fixedly provided within the mounting post, and a second magnetic member fixedly is provided within the mounting groove.

one of the first magnetic member and the second magnetic member is a permanent magnet, and another one is a primitive magnet; or, both the first magnetic member and the second magnetic member are permanent magnets, wherein facing surfaces of the first magnetic member and the second magnetic member have opposite magnetic poles.

In the quick-draw assembly structure, an assembly groove is provided at a center of the mounting post, with the first magnetic member embedded in a bottom of the assembly groove. A side of an end of the mounting post corresponding to the assembly groove and a side of the end of the mounting post being opposite to the assembly groove are provided with guide surfaces;

a positioning post is provided at a center within the mounting groove, and the positioning post is configured to be inserted into and removed from the assembly groove, the second magnetic member is embedded within the positioning post, and an end of the positioning post is provided with guide surfaces.

In the quick-draw assembly structure, the connecting member is a hanging rope buckle, the hanging rope buckle is integrally formed with the connecting member.

In the quick-draw assembly structure, anti-slip protrusions are arranged uniformly on an outer side of the sleeve.

In the quick-draw assembly structure, the main housing is removably connected to the locking member;

an outer side of the main housing is provided with a first thread, an inner side of the locking member is provided with a second thread, and the locking member is threadedly connected to the main housing.

A flashlight includes the quick-draw assembly structure, the quick-draw assembly structure includes: a main housing, with a sleeve slidably mounted on the main housing; a locking member disposed at an end of the main housing; a mounting groove provided at the end of the locking member away from the main housing, and a plurality of through holes are circumferentially arranged around the locking member, the through holes correspond to a location of the mounting groove, and a retaining member is slidably mounted within each through hole; an end cap includes a mounting post configured to be inserted into and removed from the mounting groove, the mounting post includes a locking groove corresponded to the through holes, and the locking groove is engaged with the retaining member along a predetermined arcuate surface; the end cap further includes a connecting member.

The flashlight further includes a lighting assembly, the lighting assembly is arranged inside the main housing, and an end of the main housing away from the locking member is provided with hollow out.

The beneficial effects of the present disclosure lie in: The present disclosure provides through holes corresponding to a mounting groove around an end of a locking member, and by slidably mounting a retaining member within each through hole, as well as by providing a sleeve on a main housing that is fixedly connected to the locking member, when mounting an end cap, the locking groove on one side of the mounting post of the end cap can engage with one side of the retaining member, while another side is limited and locked by the sleeve, achieving locking. Users can actively slide the sleeve to release the lock on the retaining member, enabling the end cap to quickly separate from the locking member. When applied to a flashlight, the structure not only prevents the flashlight from being lost but also allows for quick disassembly and use, thereby enhancing user experience.

DETAILED DESCRIPTION OF EMBODIMENTS

Figure 1:
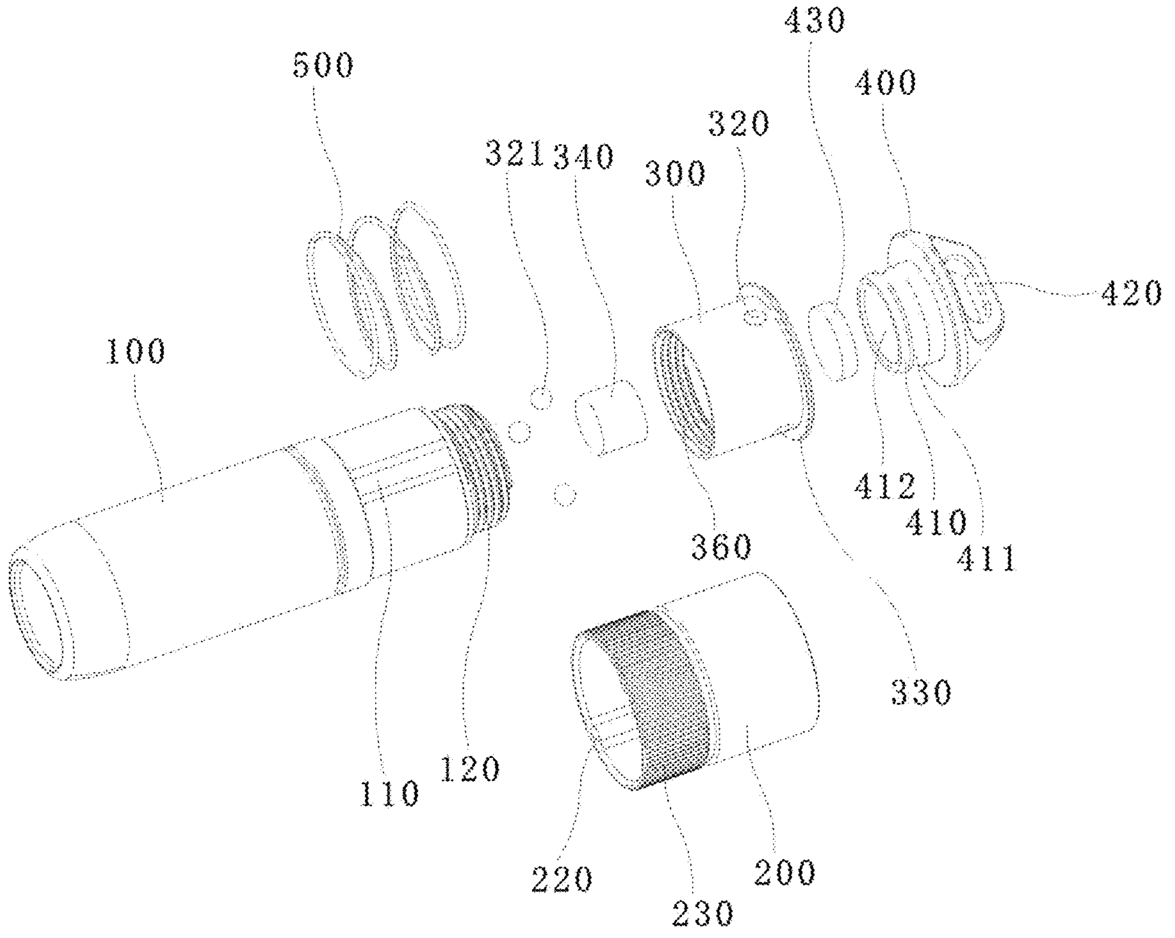
FIG. 1 is an exploded view of the quick-draw assembly structure of the present disclosure.

In order to make the objectives, technical solutions, and effects of the present disclosure clearer and more explicit, a detailed description is provided below with reference to accompanying drawings and specific embodiments. The specific embodiments described are intended to explain the present disclosure and are not meant to limit the scope of the present disclosure.

It should be noted that the embodiments of the present disclosure may employ directional indicators (such as up, down, left, right, front, back, etc.). The indicators are used exclusively to describe the relative positional relationships and motion conditions between components in a specific posture (as depicted in the drawings). If the specific posture changes, the directional indicators will also adjust accordingly.

Furthermore, when the embodiments in the present disclosure involve descriptions such as "first", "second", etc., then the descriptions of "first", "second", etc., are used solely for descriptive purposes and should not be construed as indicating or implying relative importance or implicitly specifying the number of technical features indicated. Thus, features defined by "first", "second" can explicitly or implicitly include at least one such feature. Additionally, the technical solutions of different embodiments can be combined, provided that such combinations are achievable by those ordinary skilled in the art. When combinations of technical solutions in mutual contradictions or impossibility of the embodiments, the combinations shall be deemed non-existent and fall outside the scope of protection claimed by the present disclosure.

In the prior art, when using a small flashlight fixed with a lanyard or buckle, due to binding keychains, backpack chains, and other items, the lanyards and clips are non-removable, making the usage more cumbersome. In emergency situations requiring rapid access to the flashlight, users cannot quickly retrieve or detach the flashlight for immediate manipulation, leading to a poor user experience.

Figure 5:
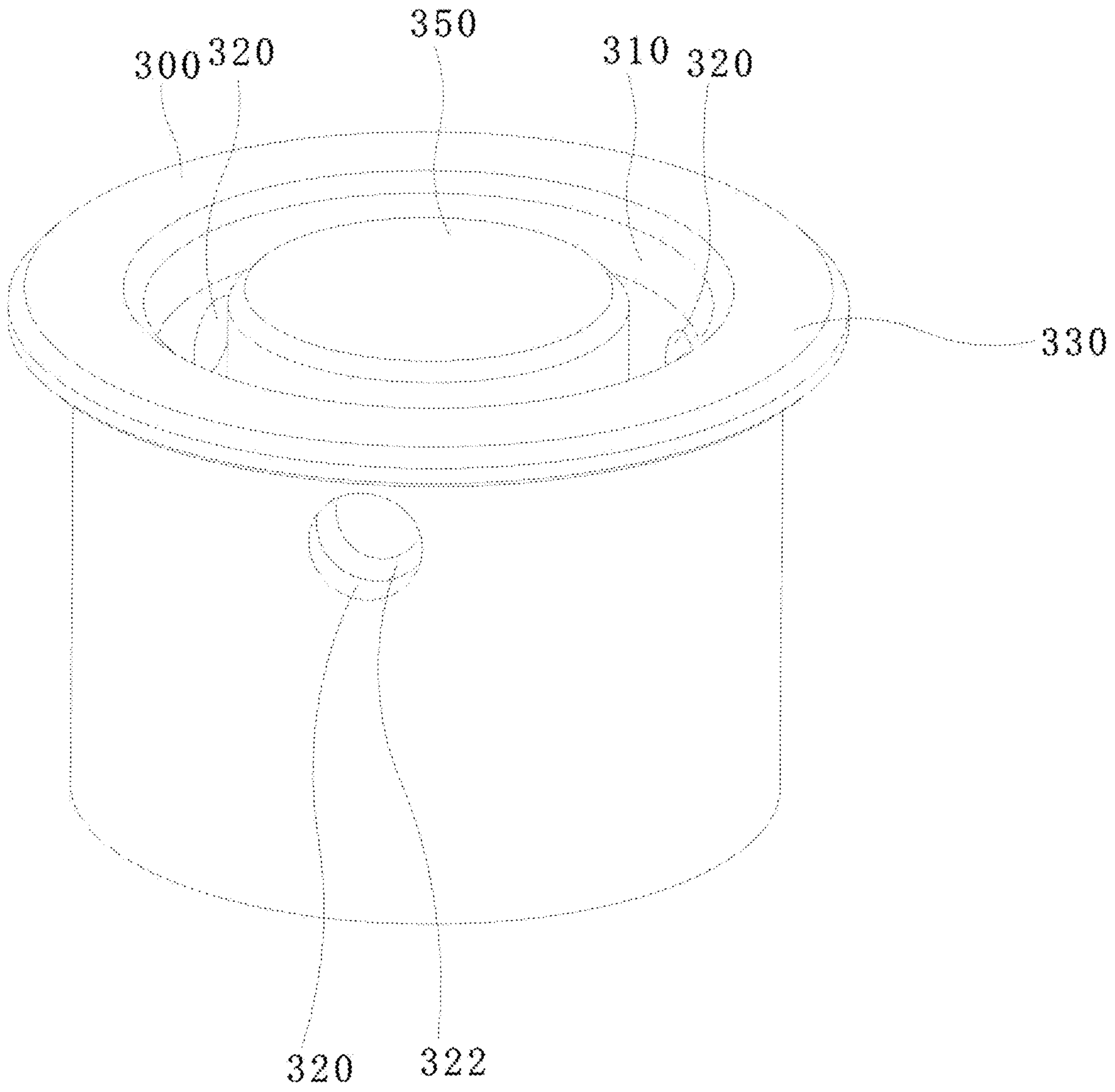
FIG. 5 is a perspective view of the locking member in the quick-dial assembly structure of the present disclosure.

Based on the problems in prior art, the present disclosure provides a quick-draw assembly structure as shown in FIG. 1 and FIG. 5. The quick-draw assembly structure includes a main housing 100, a sleeve 200 is slidably mounted on the main housing 100; a locking member 300 disposed at an end of the mounting groove 310 away from the main housing 100, and a plurality of through holes 320 are circumferentially arranged around the locking member 300, the through holes 320 are corresponded to a location of the mounting groove 310, and a retaining member 321 is slidably mounted within each of the through holes 320; an end cap 400, the end cap 400 includes a mounting post 410 configured to be inserted into and removed from the mounting groove 310, the mounting post 410 includes a locking groove 411 corresponded to the through holes 320, and the locking groove 411 is engaged with the retaining member 321 along a predetermined arcuate surface; the end cap 400 further includes a connecting member 420.

The present disclosure achieves locking by mounting the through holes 320 around an end of the locking member 300 that correspond to the mounting groove 310, with retaining members 321 slidably mounted within each through hole 320. The sleeve 200 is mounted on the main housing 100, which is fixedly connected to the locking member 300. When mounting the end cap 400, the locking groove 411 on a side of the mounting post 410 of the end cap engage with a side of the retaining members 321, while the other side is limited and locked by the sleeve 200. Users can actively slide the sleeve 200 to release the retaining members 321, allowing for quick separation of the end cap 400 from the locking member 300. When applied to a flashlight, the configuration prevents loss of the device and allows for rapid disassembly and use, thereby enhancing the user experience.

Figure 6:
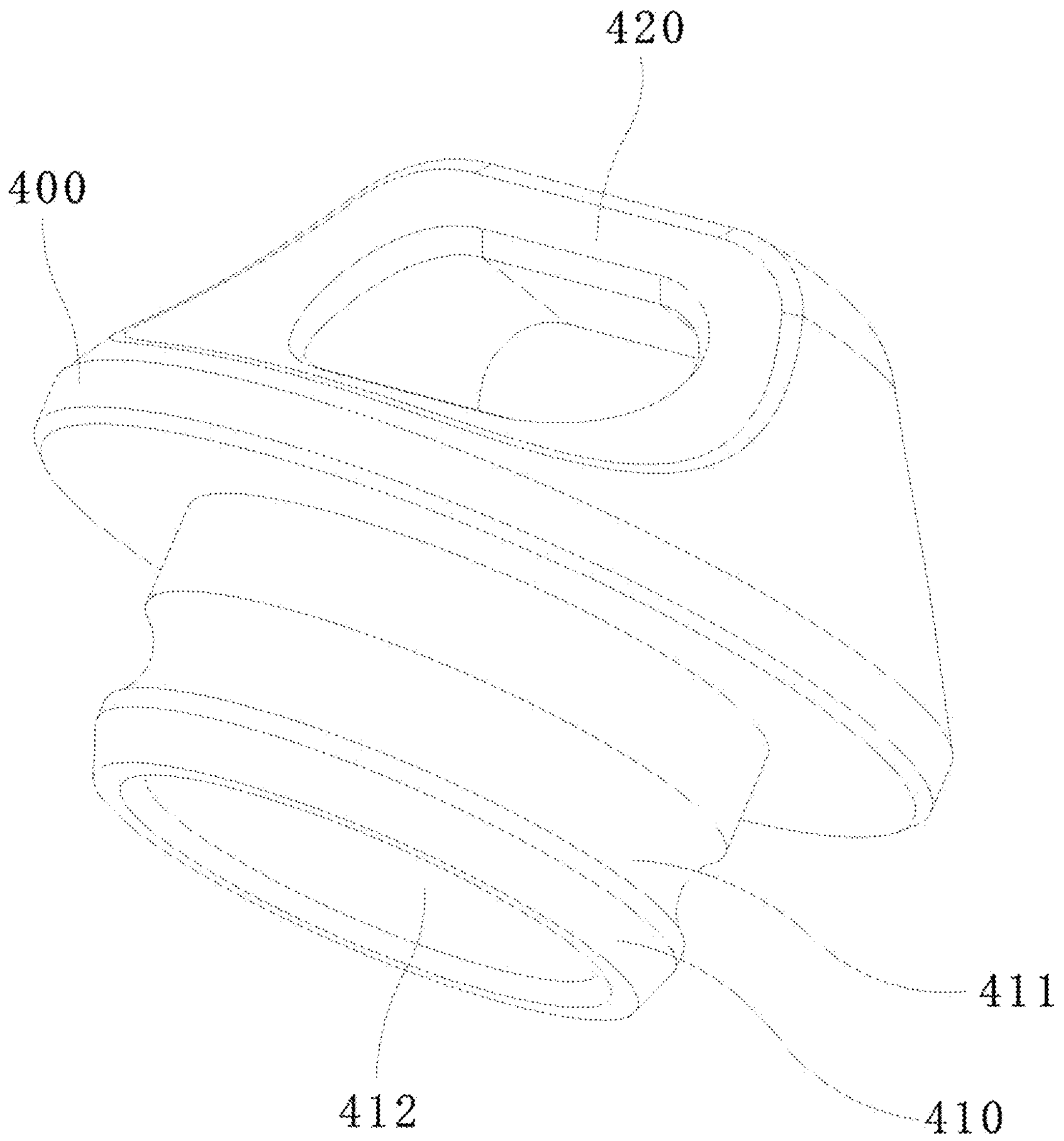
FIG. 6 is a perspective view of the end cap in the quick-draw assembly structure of the present disclosure.

In the embodiment shown in FIG. 1, the main structure of the quick-draw assembly structure includes the main housing 100, the sleeve 200, the locking member 300, and the end cap 400. The sleeve 200 is sleeved and connected onto the main housing 100, and the sleeve 200 can slide along the main housing 100. The locking member 300 is disposed at an end of the main housing 100. As shown in FIG. 5, the mounting groove 310 is provided at an end of the locking member 300 away from the main housing 100, the mounting groove 310 is used for an assembly with the end cap 400. In the embodiment, a plurality of through holes 320 are provided around the locking member 300, positioned to correspond with the mounting groove 310, the through holes 320 penetrates outer sides of the mounting groove 310 and the locking member 300. Inside the through holes 320, a retaining member 321 is provided. The retaining members 321 are slidably mounted within each of the through holes 320, and can slide along a direction of the through holes 320 and over a predetermined distance. Correspondingly, the end cap 400 includes a mounting post 410, a diameter of the mounting post 410 matches a diameter of the mounting groove 310. Allowing the end cap 400 to be inserted into the mounting groove 310 through the mounting post 410 for assembly. As shown in FIG. 1 and FIG. 6, the mounting post 410 includes a locking groove 411 corresponded to the through holes 320, and the locking groove 411 is engaged along a predetermined arcuate surface. The locking groove 411 have a predefined arcuate surface, the predefined arcuate surface matches with the arcuate surface of an end of the retaining members 321. Thus, the locking groove 411 engages and fixes with the retaining members 321 in all directions.

Figure 2:
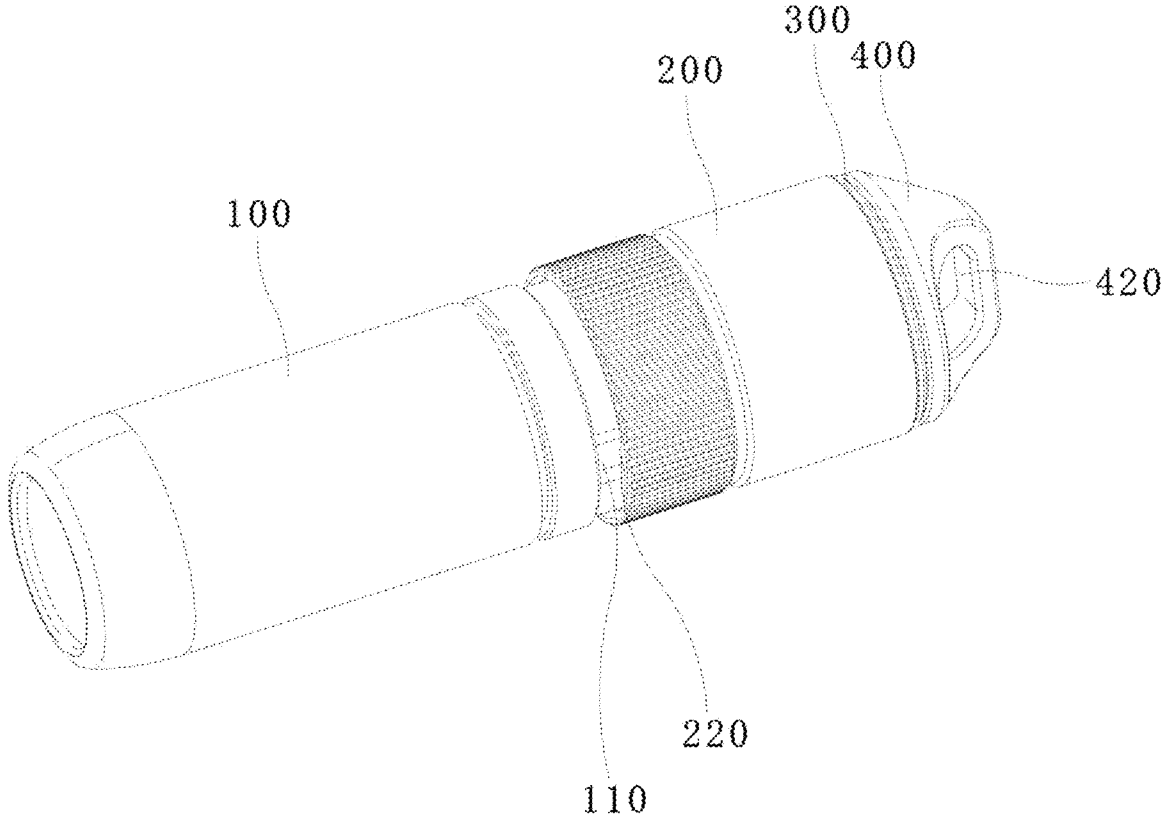
FIG. 2 is an illustration of the assembled state of the quick-draw assembly structure of the present disclosure.

In the embodiment, a combination part between the locking member 300 and the end cap 400 of the quick-draw assembly structure has two states: locked and separated. As shown in FIG. 2, in the locked state, the sleeve 200 moves to an extreme position towards the end cap 400. At the position, the sleeve 200 limits ends of a plurality of the retaining members 321, fixing the retaining members 321 at the limit position within the through holes 320 facing the mounting groove 310. When the end cap 400 is assembly with the locking member 300, the retaining members 321 is provided at the limit position, precisely corresponding to the locking groove 411 on the mounting post 410, thereby achieving an effect of a secure lock of the end cap 400 onto the locking member 300.

During transition from the locked state to the separated state, the user can slide the sleeve 200 away from the end cap 400. An outer end of the through holes 320 is opened, allowing the retaining members 321 to move freely within the through holes 320. When the user applies force to separate the main housing 100 from the end cap 400, the arcuate surface of the retaining members 321 and the locking groove 411 separate under tension and arcuate surface guiding force, pushing the retaining members 321 outwards, thereby releasing the engagement. At the point, the end cap 400 can quickly separate from the locking member 300. When mounting, after sliding the sleeve 200, press the end cap 400 towards the locking member 300. The locking groove 411 and an end of the retaining members 321 are engaged under pressure and guided by the arcuate surfaces. The sleeve 200 resets back to the original position, locking is achieved.

Based on the embodiment, as shown in FIG. 1, the connecting member 420 is also provided on the end cap 400. Users can use the connecting member 420 to securely attach the entire quick-draw assembly structure to other structures, such as backpack zippers or key rings. In the prior art, when using a small flashlight fixed with a lanyard or buckle, due to binding keychains, backpack chains, and other items, the lanyards and clips are non-removable, making the usage more cumbersome. In emergency situations requiring rapid access to the flashlight, users cannot quickly retrieve or detach the flashlight for immediate manipulation, leading to a poor user experience.

Based on the embodiment, to prevent the retaining members 321 from falling out during the unlocking process between the locking member 300 and the end cap 400 as movement occurs along the through holes 320, the embodiment restrictions are applied to a mating part of the structure. As shown in FIG. 1, the retaining members 321 is a spherical shape and preferably composed of materials such as steel rods that are heavy and resistant to rust, to ensure smooth sliding of the retaining members 321 even after prolonged use. Additionally, due to the weight, the spherical retaining member 321 can quickly change position through inertia when force is applied, facilitating rapid unlocking of the end cap 400 from the locking member 300.

A flange section 330 is provided at the end of the locking member 300 away from the main housing. The flange section 330 is flange-shaped and serves to limit the movement range of one end of the sleeve 200. Furthermore, there are structures on the main housing 100 restrict the movement range of the other end of the sleeve 200 (details provided below). Correspondingly, within the sleeve 200 adjacent to the flange section 330, a clearance ring 210 is provided. The clearance ring 210 is arranged corresponding to the through holes 320 and a side of the clearance ring 210 facing the through hole 320 is inclined at a predetermined angle. Due to the restricted movement distance of the sleeve 200, as shown in FIG. 2, when the sleeve 200 reaches an extreme position towards the end cap 400, a thickest part of the clearance ring 210 is corresponding to the retaining members 321, achieving a positioning and locking effect on the retaining members 321. When the sleeve 200 reaches the extreme position away from the end cap 400, at this time, an inclined surface of the clearance ring 210 corresponds to the through holes 320, the inclined surface provides space for the retaining members 321 to move, while restricting the limit position of the retaining members 321 movement, and simultaneously prevents the retaining members 321 from falling out of through holes 320.

Furthermore, in the embodiment, to achieve the effect of limiting a plurality of the retaining members 321 using the clearance ring 210 as described above, the through holes 320 are arranged on the same cross-section of on the locking member 300. Additionally, the structure configuration only restricts the retaining members 321 from falling out from the outer end of the through holes 320. To prevent the retaining members 321 from falling out from the inner end of the through holes 320 after separation of the end cap 400 and the locking member 300, as shown in FIG. 5, a lock ring 322 is provided at an end of the through holes 320 facing the mounting groove 310. A center of the lock ring 322 is corresponding to the through holes 320, providing space for the retaining members 321 to contact the locking groove 411. A diameter of the lock ring 322 is slightly smaller than A diameter of the through holes 320, and an inner side of the lock ring 322 has a shape that matches the arcuate surface of the retaining members 321. The configuration restricts the movement of the retaining members 321 to the extreme position within the through holes 320.

Figure 3:
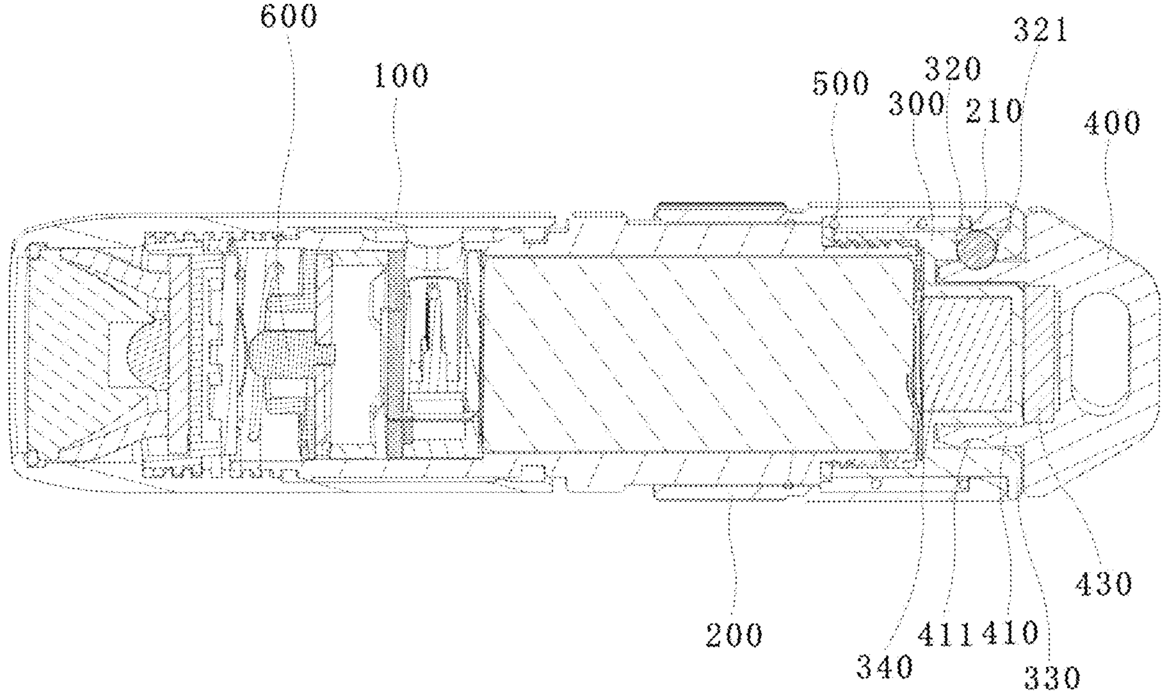
FIG. 3 is a cross-sectional view of the quick-draw assembly structure of the present disclosure.

In another embodiment of the present disclosure, as shown in FIG. 1 and FIG. 3, in order to enable the sleeve 200 automatically reset to the original position and prevent user from repeatedly adjusting and enhance the fool-proofing, a reset spring 500 is provided on the main housing 100. For ease of description, a left end of the reset spring 500 in FIG. 3 is referred to as a fixed end, and a right end as an adjustable end. The fixed end of the reset spring 500 is connected to the main housing 100, while the adjustable end is fixed within the sleeve 200 at the position corresponding to the clearance ring 210. In an initial state, the reset spring 500 prearranges an end facing the end cap 400 of the sleeve 200 abuts against the flange section 330. In the initial state, the thickest part of the clearance ring 210 is corresponding to the retaining members 321, causing an opposite side of the retaining members 321 to abuts against the lock ring 322, protruding towards the mounting groove 310. When the user slides the sleeve 200, the sleeve 200 moves along the main housing 100, and the reset spring 500 accumulates elastic potential energy. Once the user releases the force, the accumulated energy in the reset spring 500 returns the sleeve 200 to the original position. The mechanism prevents situations where the user forgets to rearranged the sleeve 200 which could lead to unreliable or incomplete engagement between the locking member 300 and the end cap 400.

Figure 4:
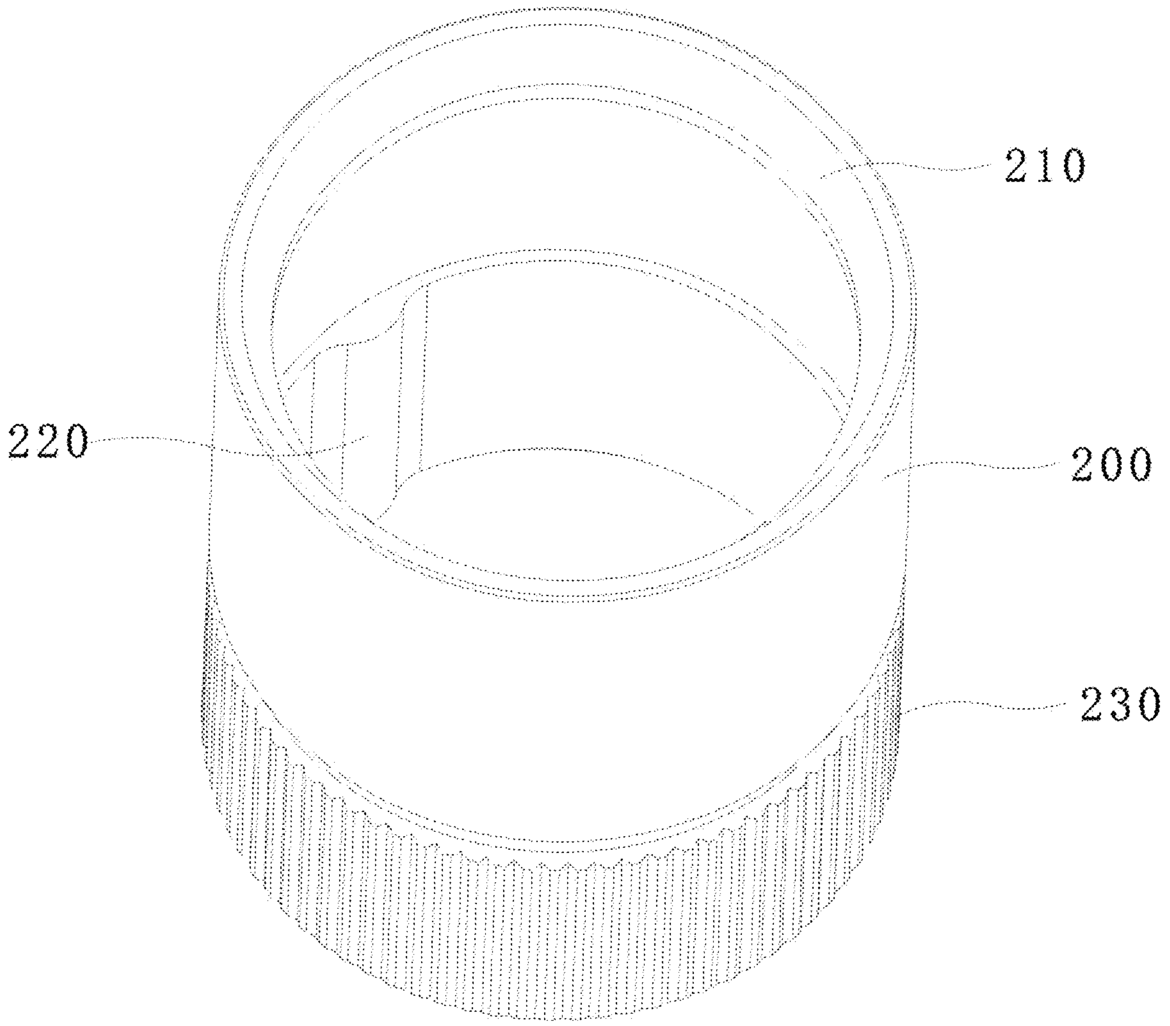
FIG. 4 is a perspective view of the sleeve in the quick-draw assembly structure of the present disclosure.

In another embodiment of the present disclosure, as shown in FIG. 1 and FIG. 4, since the reset spring 500 has a torsional structure, to prevent radial force applied by the user when sliding the sleeve 200 from causing relative rotation between the sleeve 200 and the main housing 100, which could lead to a failure of the reset spring 500. A plurality of slide grooves 110 are provided along the length of the outer side of the main housing 100 in the present disclosure. The fixed end of the reset spring 500 is provided at an end of the slide grooves 110 facing the end cap 400, achieving a secure fixation without affecting the function of the slide grooves 110. Another end of each slide groove 110 is closed, thereby limiting the length of the slide grooves 110. Correspondingly, on an inner side of the sleeve 200, a plurality of slide rails 220 are provided corresponding to the slide grooves 110. The slide rails 220 correspond one-to-one with the slide grooves 110 and form sliding connections. The sleeve 200 is ensured to slide along the length of the main housing 100 while preventing radial twisting between the sleeve 200 and the main housing 100, thus enhancing lifespan of the reset spring 500.

Furthermore, as shown in FIG. 4, anti-slip protrusions 230 are evenly distributed on the outer side of the sleeve 200 to increase friction between fingers and an outer surface of the sleeve 200, facilitating quick one-handed operation and ensuring a secure grip in various conditions, such as rainy or snowy weather.

In another embodiment of the present disclosure, as shown in FIG. 1 and FIG. 5, to assist users in quickly inserting the mounting post 410 into the mounting groove 310 when mounting the end cap 400 and the locking member 300, a first magnetic member 430 is fixedly provided within the mounting post 410, and a second magnetic member 340 is fixedly provided within the mounting groove 310, thus assisting users in quickly aligning through magnetic attraction.

When mounting, the first magnetic member 430 and the second magnetic member 340 can also be mounted such that: one of the first magnetic member 430 and the second magnetic member 340 is a permanent magnet, and another one is a primitive magnet; that is, one is a permanent magnet or a component with permanent magnetic properties, while the other is a component can be attracted by a magnet but does not possess magnetic properties itself, such as iron parts.

In Addition, the first magnetic member 430 and the second magnetic member 340 can also be mounted such that the first magnetic member 430 and the second magnetic member 340 are both permanent magnets, and both are magnets with permanent magnetism. In the embodiment, attention should be paid to the mounting direction of the first magnetic member 430 and the second magnetic member 340 to ensure the poles on the facing surfaces of the first magnetic member 430 and the second magnetic member 340 are opposite, ensuring the facing surfaces attract each other, achieving a guiding effect through mutual attraction.

In the embodiment, due to the magnetic attraction between the first magnetic member 430 and the second magnetic member 340, to prevent either the first magnetic member 430 or the second magnetic member 340 from falling out after prolonged use, as shown in FIG. 1 and FIG. 6, an assembly groove 412 is provided at a center of the mounting post 410. The first magnetic member 430 is fixedly embedded in a bottom of the assembly groove 412. Correspondingly, a positioning post 350 matches with the assembly groove 412 is arranged at the center of the mounting groove 310. The assembly groove 412 is configured to be inserted into and removed from the positioning post 350. The second magnetic member 340 is embedded within the positioning post 350. Thus, the first magnetic member 430 and the second magnetic member 340 do not come into direct contact, both are restrained by respective components through a snap-fit structure, thereby effectively preventing either the first magnetic member 430 or the second magnetic member 340 from falling out after repeated use.

In the embodiment, to ensure the positioning post 350 smoothly insert into and remove from the assembly groove 412, and ensure the mounting post 410 smoothly insert into and remove from the mounting groove 310, an inclined guide surface is provided in the present disclosure on sides of the end of the mounting post 410 facing the assembly groove 412 and away from the assembly groove 412. Similarly, an inclined guide surface is provided at the end of the positioning post 350. The guide surfaces have a specific angle of inclination. Under the magnetic attraction between the first magnetic member 430 and the second magnetic member 340, combined with the guiding effect of the inclined surfaces, rapidly alignment and engagement between the end cap 400 and the locking member 300 are enabled.

In one embodiment of the present disclosure, as shown in FIG. 1 and FIG. 6, the connecting member 420 is a hanging rope buckle, the hanging rope buckle is integrally formed with the connecting member 420 to ensure structural strength. When mounting, the hanging rope buckle should include at least one through hole 320 for securing a lanyard using a knot. In practical use, the lanyard can be tied to other structures, such as key rings or backpack zippers, achieving a secure attachment and facilitating portability.

In another embodiment of the present disclosure, the main housing 100 and the locking member 300 are connected in a slidably manner, for purpose, on one side, to facilitate the mounting of other accessories such as the sleeve 200, and on the other side, it can facilitate the mounting of functional structures inside the main housing 100, so that the main housing 100 has specific functional effects. For instance, mounting a light assembly can transform the main housing 100 into a small flashlight, or outdoor tools can be placed inside. The quick-draw assembly structure ensures secure portability and rapid disassembly for use. In the embodiment, specific internal structures of the main housing 100 are not limited by the present disclosure, and those skilled in the art can apply the quick-draw assembly structure based on actual design requirements.

In the embodiment, as shown in FIG. 1 and FIG. 3, the outer side of the main housing 100 is provided with a first thread 120, while the inner side of the locking member 300 is provided with a second thread 360. The main housing 100 and the locking member 300 are rotationally connected using the first thread 120 and the second thread 360, forming a secure connection. The moving range of the sleeve 200 is limited to ensure the normal use of the quick-draw assembly structure, and it is also convenient to arrange, disassemble and repair other functional structures in the main housing 100.

Based on the embodiments, the complete assembly state of the quick-draw assembly structure of the present disclosure is shown in FIG. 2. In practical use, the entire quick-draw assembly structure is mounted on other structures through the connecting member 420 on the end cap 400, in conjunction with a rope lock, achieving a portable and secure mounting effect. When disassembly is required, the user simply slides the sleeve 200 to move the clearance ring 210 corresponding to the through holes 320 on the locking member 300, providing movement space for the retaining members 321 within the through holes 320. By pulling, the user can release the locking engagement between the locking groove 411 on the end cap 400 and the retaining members 321, thus quickly separating the end cap 400 from the locking member 300.

When mounting the end cap 400 with the locking member 300, the user slides the sleeve 200. Under the magnetic attraction between the first magnetic member 430 and the second magnetic member 340, the mounting groove 310 on the locking member 300 is quickly corresponding to the mounting post 410 on the end cap 400, and is displaced to a predetermined position corresponding to the locking groove 411 with the retaining member 321, then, under the force of the reset spring 500, the sleeve 200 automatically returns to the original position, achieving the locking of the combined state of the locking member 300 and the end cap 400.

In practical applications, the quick-draw assembly structure can prevent the loss of small tools and also allow for quick disassembly and use, thereby enhancing the user experience.

Based on the embodiments, the present disclosure also provides a flashlight, the flashlight includes the quick-draw assembly structure in the embodiments. As shown in FIG. 1 and FIG. 5, the quick-draw assembly structure includes: a main housing 100, a sleeve 200 is slidably mounted on the main housing 100; a locking member 300, the locking member 300 is disposed at an end of the main housing 100, and a mounting groove 310 is provided at an end of the locking member 300 away from the main housing 100, and a plurality of through holes 320 are circumferentially arranged around the locking member 300, the through holes 320 are corresponded to a location of the mounting groove 310, and a retaining member 321 is slidably mounted within each of the through holes 320; an end cap 400, the end cap 400 includes a mounting post 410 configured to be inserted into and removed from the mounting groove 310, the mounting post 410 includes a locking groove 411 corresponded to the through holes 320, and the locking groove 411 is engaged with the retaining member 321 along a predetermined arcuate surface; the end cap further includes a connecting member 420;

Additionally, as shown in FIG. 3, the flashlight further includes a lighting assembly 600, is the lighting assembly is provided inside the main housing 100, and the end of the main housing 100 away from the locking member 300 is provided with hollow out, used to illuminate outward from the exterior of the main housing 100 by the lighting assembly 600.

In summary, the present disclosure provides a quick-draw assembly structure and a flashlight. The quick-draw assembly structure includes: a main housing, a sleeve is slidably mounted on the main housing; a locking member, the locking member is disposed at an end of the main housing, a mounting groove is provided at an end of the locking member away from the main housing, and a plurality of through holes are circumferentially arranged around the locking member, the through holes are corresponded to a location of the mounting groove, and a retaining member is slidably mounted within each of the through holes; an end cap, the end cap comprises a mounting post configured to be inserted into and removed from the mounting groove, the mounting post comprises a locking groove corresponded to the through holes, and the locking groove is engaged with the retaining member along a predetermined arcuate surface; the end cap further comprises a connecting member.

The present disclosure achieves locking by providing the through holes corresponding to the mounting groove around an end of the locking member, and by slidably mounting a retaining member within each through hole, as well as by providing the sleeve on the main housing that is fixedly connected to the locking member, when mounting the end cap, the locking groove on one side of the mounting post of the end cap can engage with one side of the retaining member, while another side is limited and locked by the sleeve. Users can actively slide the sleeve to release the lock on the retaining member, enabling the end cap to quickly separate from the locking member. When applied to a flashlight, the structure not only prevents the flashlight from being lost but also allows for quick disassembly and use, thereby enhancing user experience.

The applications of the present disclosure are not limited to the embodiments described above. Those skilled in the art can make various improvements or modifications based on the descriptions provided. All such improvements and modifications fall within the scope of protection defined by the appended claims of the present disclosure.

What is claimed is:

1. A flashlight, comprising a quick-draw assembly structure, wherein the quick-draw assembly structure comprises:

a main housing, wherein a sleeve is slidably mounted on the main housing;

a locking member, the locking member is disposed at an end of the main housing, wherein a mounting groove is provided at an end of the locking member away from the main housing, and a plurality of through holes are circumferentially arranged around the locking member, the through holes are corresponded to a location of the mounting groove, and a retaining member is slidably mounted within each of the through holes;

an end cap, the end cap comprises a mounting post configured to be inserted into and removed from the mounting groove, the mounting post comprises a locking groove corresponded to the through holes, and the locking groove is engaged with the retaining member along a predetermined arcuate surface; the end cap further comprises a connecting member; and the flashlight further comprises a lighting assembly, is the lighting assembly is arranged inside the main housing, and the end of the main housing away from the locking member is provided with hollow out.

2. The quick-draw assembly structure according to claim 1, wherein the retaining member is spherical; and a flange section is provided at the end of the locking member away from the main housing;

a clearance ring is provided at an end of an inner side of the sleeve corresponding to the flange section, wherein a side of the clearance ring facing the through holes is inclined at a predetermined angle, and the clearance ring is configured to provide movement space for the retaining member; and the plurality of through holes are arranged on a same cross-section of the locking member, wherein an end of each through hole facing the mounting groove is provided with a lock ring, and a side of the lock ring facing inward the through holes is shaped to match a spherical surface of the retaining member.

3. The quick-draw assembly structure according to claim 2, wherein the main housing is provided with a reset spring, a fixed end of the reset spring is fixedly connected to the main housing, and an adjustable end of the reset spring is fixed within the sleeve at a position corresponding to the clearance ring, and the reset spring is configured to limit a sliding distance of the sleeve and to reset a position of the sleeve.

4. The quick-draw assembly structure according to claim 3, wherein a plurality of slide grooves extending along a length direction of the main housing are provided on an outer side of the main housing; the fixed end of the reset spring is located at an end of each slide groove, and another end of each slide groove is closed;

a plurality of slide rails corresponding to the plurality of slide grooves are provided on an inner side of the sleeve, wherein the plurality of slide rails and the plurality of slide grooves are one-to-one corresponded and slidably and engageably connected.

5. The quick-draw assembly structure according to claim 1, wherein a first magnetic member is fixedly provided within the mounting post, and a second magnetic member is fixedly provided within the mounting groove; and one of the first magnetic member and the second magnetic member is a permanent magnet, and another one is a primitive magnet; or, both the first magnetic member and the second magnetic member are permanent magnets, wherein facing surfaces of the first magnetic member and the second magnetic member have opposite magnetic poles.

6. The quick-draw assembly structure according to claim 5, wherein an assembly groove is provided at a center of the mounting post, and the first magnetic member is embedded in a bottom of the assembly groove; a side of an end of the mounting post corresponding to the assembly groove and a side of the end of the mounting post being opposite to the assembly groove are both provided with guide surfaces;

a positioning post is provided at a center within the mounting groove, and the positioning post is configured to be inserted into and removed from the assembly groove, the second magnetic member is embedded within the positioning post, and an end of the positioning post is provided with guide surfaces.

7. The quick-draw assembly structure according to claim 1, wherein the connecting member is a hanging rope buckle, and the hanging rope buckle is integrally formed with the connecting member.

8. The quick-draw assembly structure according to claim 1, wherein an outer side of the sleeve is provided with anti-slip protrusions arranged uniformly.

9. The quick-draw assembly structure according to claim 1, wherein the main housing is removably connected to the locking member; and an outer side of the main housing is provided with a first thread, an inner side of the locking member is provided with a second thread, and the locking member is threadedly connected to the main housing.

10. A flashlight, comprising the quick-draw assembly structure according to claim 1, wherein the quick-draw assembly structure comprises:

a main housing, wherein a sleeve is slidably mounted on the main housing;

a locking member, the locking member is disposed at an end of the main housing, wherein a mounting groove is provided at an end of the locking member away from the main housing, and a plurality of through holes are circumferentially arranged around the locking member, the through holes are corresponded to a location of the mounting groove, and a retaining member is slidably mounted within each of the through holes;

an end cap, the end cap comprises a mounting post configured to be inserted into and removed from the mounting groove, the mounting post comprises a locking groove corresponded to the through holes, and the locking groove is engaged with the retaining member along a predetermined arcuate surface; the end cap further comprises a connecting member; and the flashlight further comprises a lighting assembly, is the lighting assembly is arranged inside the main housing, and the end of the main housing away from the locking member is provided with hollow out.

* * * * *